(12) United States Patent
Michel et al.

(10) Patent No.: US 11,339,301 B2
(45) Date of Patent: May 24, 2022

(54) SELF ADHESIVE FOULING RELEASE COATING COMPOSITION

(71) Applicant: AVERY DENNISON CORPORATION, Glendale, CA (US)

(72) Inventors: Gautier Michel, Soignies (BE); Guy Siraux, Soignies (BE); Daniele Perotti, Soignies (BE); Kees Van Der Kolk, Uitgeest (NL); Jacques Courtin, Leiderdorp (NL)

(73) Assignee: AVERY DENNISON CORPORATION, Mentor, OH (US)

( * ) Notice: Subject to any disclaimer, the term of this patent is extended or adjusted under 35 U.S.C. 154(b) by 0 days.

(21) Appl. No.: 15/546,172

(22) PCT Filed: Jan. 26, 2016

(86) PCT No.: PCT/EP2016/051541
§ 371 (c)(1),
(2) Date: Jul. 25, 2017

(87) PCT Pub. No.: WO2016/120255
PCT Pub. Date: Aug. 4, 2016

(65) Prior Publication Data
US 2018/0016444 A1    Jan. 18, 2018

(30) Foreign Application Priority Data
Jan. 26, 2015   (EP) ..................................... 15152553

(51) Int. Cl.
*B32B 23/08*   (2006.01)
*C09D 5/16*    (2006.01)
(Continued)

(52) U.S. Cl.
CPC ............. *C09D 5/1693* (2013.01); *C08K 5/098* (2013.01); *C08L 23/12* (2013.01); *C09D 5/16* (2013.01);
(Continued)

(58) Field of Classification Search
CPC ......... C08K 5/098; C08K 5/544; C08L 23/12; C09D 183/04; C09D 5/16; C09D 5/1662;
(Continued)

(56) References Cited

U.S. PATENT DOCUMENTS

RE28,459 E  *  7/1975 Cole ..................... F26B 13/101
                                                    34/306
4,025,693 A     5/1977 Milne
(Continued)

FOREIGN PATENT DOCUMENTS

CN          1886470       12/2006
CN          101155647      9/2012
(Continued)

OTHER PUBLICATIONS

Machine translation of DE 10-2012-220286 retrieved Oct. 21, 2018.*
(Continued)

*Primary Examiner* — Michael B Nelson
(74) *Attorney, Agent, or Firm* — Wenderoth, Lind & Ponack, L.L.P.

(57) ABSTRACT

A multilayer self-adhesive fouling release coating composition includes an optional removable underlying liner; an adhesive layer applied over and to the optional underlying liner when the latter is present; and a synthetic material layer applied over and to the adhesive layer. Optionally, an intermediate silicone tie coat is applied over and to the synthetic material layer. A silicone fouling release top coat is applied over and to the synthetic material layer, or, when
(Continued)

present, over and to the intermediate silicone tie coat. Optionally, a removable polymeric film is applied over and to the fouling release top coat.

8 Claims, 1 Drawing Sheet

(51) Int. Cl.
| | |
|---|---|
| C08K 5/098 | (2006.01) |
| C08L 23/12 | (2006.01) |
| C09D 183/04 | (2006.01) |
| B32B 27/00 | (2006.01) |
| B32B 37/26 | (2006.01) |
| B32B 37/00 | (2006.01) |
| B32B 37/12 | (2006.01) |

(52) U.S. Cl.
CPC ......... *C09D 5/1662* (2013.01); *C09D 5/1675* (2013.01); *C09D 183/04* (2013.01); *B32B 23/08* (2013.01); *B32B 27/00* (2013.01); *B32B 37/12* (2013.01); *B32B 37/26* (2013.01); *B32B 2037/0092* (2013.01); *B32B 2037/1269* (2013.01); *B32B 2037/268* (2013.01); *B32B 2250/00* (2013.01); *B32B 2255/28* (2013.01); *B32B 2264/1027* (2020.08); *B32B 2307/746* (2013.01); *B32B 2307/748* (2013.01); *B32B 2383/00* (2013.01); *B32B 2405/00* (2013.01); *C09J 2301/00* (2020.08); *C09J 2301/12* (2020.08); *C09J 2301/30* (2020.08); *C09J 2301/40* (2020.08); *C09J 2483/00* (2013.01); *C09J 2483/003* (2013.01); *C09J 2483/005* (2013.01); *Y10T 428/1476* (2015.01); *Y10T 428/23979* (2015.04); *Y10T 428/2486* (2015.01); *Y10T 428/24942* (2015.01); *Y10T 428/24967* (2015.01); *Y10T 428/26* (2015.01); *Y10T 428/27* (2015.01); *Y10T 428/2839* (2015.01); *Y10T 428/2852* (2015.01); *Y10T 428/2933* (2015.01)

(58) Field of Classification Search
CPC .... C09D 5/1675; C09D 5/1693; B32B 23/08; B32B 27/00; B32B 37/12; B32B 37/26; B32B 2037/0092; B32B 2037/1269; B32B 2037/268; B32B 2250/00; B32B 2255/28; B32B 2264/1027; B32B 2307/746; B32B 2307/748; B32B 2383/00; B32B 2405/00; C09J 2301/00; C09J 2301/12; C09J 2301/30; C09J 2301/40; C09J 2483/00; C09J 2483/003; C09J 2483/005; Y10T 428/1476; Y10T 428/23979; Y10T 428/2486; Y10T 428/24942; Y10T 428/24967; Y10T 428/26; Y10T 428/27; Y10T 428/2839; Y10T 428/2852; Y10T 428/2933
See application file for complete search history.

(56) References Cited

U.S. PATENT DOCUMENTS

| | | | |
|---|---|---|---|
| 4,465,715 A * | 8/1984 | Manabe | B05D 3/0473 |
| | | | 427/307 |
| 4,650,889 A * | 3/1987 | Plueddemann | C07F 7/1804 |
| | | | 556/421 |
| 4,861,670 A | 8/1989 | Lampe et al. | |
| 6,013,754 A | 1/2000 | Fillion et al. | |
| 6,562,414 B2 | 5/2003 | Carling | |
| 7,455,909 B2 | 11/2008 | Stanislawczyk et al. | |
| 7,842,288 B2 | 11/2010 | Weed | |
| 7,973,108 B2 | 7/2011 | Okamoto et al. | |
| 8,067,066 B2 | 11/2011 | Scholten et al. | |
| 9,605,189 B2 | 3/2017 | Hirose et al. | |
| 2006/0118326 A1* | 6/2006 | Koike | C09J 7/29 |
| | | | 174/137 B |
| 2006/0216452 A1* | 9/2006 | Tomita | B32B 27/18 |
| | | | 428/40.1 |
| 2007/0166501 A1* | 7/2007 | Seitz | B32B 7/10 |
| | | | 428/41.8 |
| 2009/0042042 A1 | 2/2009 | Yuki et al. | |
| 2011/0212332 A1 | 9/2011 | Matsuzawa et al. | |
| 2012/0003451 A1* | 1/2012 | Weigel | B32B 17/10018 |
| | | | 428/213 |
| 2012/0135244 A1 | 5/2012 | Yuki et al. | |
| 2014/0037950 A1 | 2/2014 | Amano et al. | |
| 2014/0377552 A1* | 12/2014 | Kurata | C09D 5/1675 |
| | | | 428/354 |
| 2015/0004406 A1 | 1/2015 | Suzuki et al. | |
| 2015/0079345 A1 | 3/2015 | Kurata et al. | |
| 2015/0218420 A1 | 8/2015 | Hara et al. | |
| 2015/0284058 A1 | 10/2015 | Swain et al. | |
| 2016/0063900 A1 | 3/2016 | Gorelik et al. | |
| 2016/0122593 A1 | 5/2016 | Kurata et al. | |
| 2016/0208145 A1 | 7/2016 | Eversole et al. | |
| 2016/0376470 A1 | 12/2016 | Hirose et al. | |
| 2017/0306184 A1* | 10/2017 | Nakayama | C08F 230/08 |

FOREIGN PATENT DOCUMENTS

| | | |
|---|---|---|
| CN | 101821318 | 12/2012 |
| CN | 10-4044694 | * 12/2014 |
| DE | 10-2004-051418 | 9/2010 |
| DE | 10-2012-220286 | * 12/2012 |
| EP | 0 521 983 | 6/1994 |
| EP | 0 874 032 | 10/1998 |
| EP | 1 867 401 | 12/2007 |
| EP | 1 699 885 | 7/2008 |
| EP | 2 796 522 | 10/2014 |
| EP | 2 801 597 | 11/2014 |
| EP | 2 832 808 | 2/2015 |
| EP | 2 993 211 | 3/2016 |
| EP | 3 015 519 | 5/2016 |
| EP | 3 020 776 | 5/2016 |
| EP | 2 894 206 | 4/2017 |
| EP | 3 020 778 | 5/2019 |
| JP | 57-015870 | 1/1982 |
| JP | 06-033024 | 2/1994 |
| JP | 08-281877 | 10/1996 |
| JP | 10-309518 | 11/1998 |
| JP | 2003-025478 | 1/2003 |
| JP | 2006-057046 | 3/2006 |
| JP | 2006-152201 | 6/2006 |
| JP | 2008-265308 | 11/2008 |
| JP | h09-235525 | * 12/2009 |
| JP | 2013-129724 | 7/2013 |
| WO | 2005/108499 | 11/2005 |
| WO | 2012/175459 | 12/2012 |
| WO | 2015/182610 | 12/2015 |
| WO | 2015/182611 | 12/2015 |
| WO | WO 2016/059841 | * 1/2016 |
| WO | 2016/088631 | 6/2016 |

OTHER PUBLICATIONS

Machine translation of CN 10-4044694 retrieved Oct. 21, 2018.*
Machine translation of JP h09-235525 retrieved Oct. 21, 2018.*
Plasma grafting—a method to obtain monofunctional surfaces (Year: 1999).*
Plasma functionalization of polypropylene with acrylic acid (Year: 2003).*
Shin etsu NPL document retrieved Jan. 25, 2021.*
International Search Report dated May 2, 2016 in International (PCT) Application No. PCT/EP2016/051541.
Written Opinion of the International Searching Authority dated May 2, 2016 in corresponding International (PCT) Application No. PCT/EP2016/051541.

(56) References Cited

OTHER PUBLICATIONS

Extended European Search Report dated Jul. 7, 2015 in corresponding European Application No. 15152553.2.
International Preliminary Report on Patentability dated Feb. 1, 2017 issued in corresponding IA No. PCT/EP2016/051541 filed on Jan. 26, 2016.

* cited by examiner

SELF ADHESIVE FOULING RELEASE COATING COMPOSITION

TECHNICAL FIELD

The present invention relates to a multilayer self adhesive fouling release coating composition, in particular, a fouling release coating composition for use on underwater structures such as ship's hulls which may become fouled by aquatic organisms. The multilayer self-adhesive fouling release composition is intended for reducing the adhesion of aquatic organisms, in particular for preventing the fouling anchorage on underwater structures such as ship's hulls, harbor facilities, maritime oil field facilities, buoys, etc. This self-adhesive fouling release composition avoids silicone contamination from the spraying of silicone paint during the application. The present invention also relates to its method of preparation, as well as to a method of preparation of coated structures using the composition of the invention, and to structures thus coated.

BACKGROUND

The presence of fouling on submerged structures can lead to a reduction in their performance, such as damage to static structures and underwater equipment or reduced speed and increased fuel consumption in ships. Fouling on submerged or underwater structures, such as a ship in contact with water, can be due to barnacles, mussels, moss animals, green algae, etc. Fouling on submerged or underwater structures is also known to lead to reduced maneuverability or to a reduction in thermal conductivity and is known to necessitate a cleaning operation which takes a lot of time and results in economic loss. Antifouling systems have therefore been used to combat the detrimental effects of such fouling. Besides, antifouling systems can be used to prevent the detrimental effects of such fouling.

Conventional antifouling coatings are primarily composed of one or more biocides incorporated into a paint matrix. Such biocides are toxic for aquatic life and human health. One such family of marine coatings, the highly successful self-polishing antifouling coatings based on organotin (TBT) polymers, has now been banned by legislation. Accordingly, marine coatings chemists are currently trying to improve alternative tin-free, self-polishing copolymers such as silyl or copper acrylates to match the effectiveness of TBT polymers.

Further legislation to curb the detrimental environmental effects caused by biocidal antifoulants has also led to the development of alternative coating systems. A common property of all fouling organisms is the capacity for adhesion to the substrate, and an alternative to the use of biocides is to use physical surface phenomena to disrupt the adhesion process. Low surface free energy materials based on silicone elastomers provide a possible solution and are now increasingly used as fouling resistant coatings. In particular, environmentally friendly and biocide-free alternative coating systems, which can be called "fouling release" systems, are obtained by using silicone-based components. Such fouling release systems are effective due to the physical properties of the surfaces. A low surface energy and low elastic modulus of the surface are not appropriate for the aquatic organisms to adhere firmly to the surface, which thus reduces the fouling.

Low surface free energy coatings are potentially nontoxic, nonpolluting coatings that resist adhesion of fouling organisms and are easy to clean. In theory, these nonwetting surfaces prevent fouling attachment or limit it so that it can be removed by weak forces such as those due to movement through water or gentle cleaning. There is no depletion of any active substance as would occur with conventional biocidal antifouling systems, resulting in a potentially longer life, and no toxic material release into the environment. In addition, toxic antifoulants are often specific for certain types of fouling, whereas low free surface energy coatings provide universal protection against any kind of attachment.

In practice, the low surface free energy coating system employs a tough, cross-linked thermoplastic elastomeric layer (herein called "tie coat") to bond a foul-release silicone top coat (herein called "FR topcoat" or "Fouling Release Top coat") to the underlying anticorrosive layer. The mechanical properties are imparted by this tie coat layer, while the FR top coat provides the foul-release characteristics. Fouling release top coat compositions typically include functionalized silicone polymers, fillers, cross linkers, exuding liquids, proprietary additives and catalysts. Some examples of patents further describing this technology include U.S. Pat. No. 4,025,693 (International Paint), EP 0521983 (Courtaulds), U.S. Pat. No. 6,013,754 (Courtaulds) and WO 05/108499 (Hempel). There are many commercial foul or fouling release coating including, for example SIGMAGLIDE® system sold by PPG.

However, the application of these fouling release coatings is very expensive, time-consuming and polluting for the environment. Besides, the fouling leads to great economic losses by necessitating extensive cleaning operations.

Indeed, the fouling release coatings, notably their tie coat and FR top coat, generally requires to be applied in successive steps, layer by layer, using an airless spray, with generally long drying periods there between. Further, large amounts of the fouling release coating are over sprayed in the air due to wind and thus wasted, thereby further increasing the costs of application and leading to a pollution of the environment.

In addition, the airless spray application of foul release coatings requires protecting all the surfaces which are not to be coated in order to avoid silicone contamination. Indeed, the properties of silicone, which give rise to low surface energies also result in low solubility parameters, and, hence incompatibility with other polymers. Therefore, great care must be taken to reduce the possibility of silicone cross contamination with other surface coatings during application. Therefore, fouling release coatings are being applied in dedicated pre-delivery docks, which are generally situated at a different location, thereby further increasing the costs of application.

Unexpectedly, it now has been found that the fouling release coatings, including the FR top coat and the tie coat, can be secured by coating them on a self-adhesive product using a synthetic material. In one case, the fouling release coatings, including the FR top coat and the tie coat, can be secured to an adhesive layer when use is made of a polar thermoplastic elastomer selected from a polyurethane or a polyolefin grafted with polar groups. In other words, instead of spraying the fouling release coatings, including the FR top coat and the tie coat, these coats can be coated on a self-adhesive product using a synthetic material. Advantageously, this multilayer, self-adhesive, release fouling coating composition can be directly applied on substrate's surface, in particular on the hull of a boat, in one single step, by simply pasting the self adhesive composition on the surface to be coated, and thus avoiding the drawbacks of the fouling release compositions of the prior art requiring an application by spraying.

SUMMARY OF THE INVENTION

In a first aspect, the invention provides a multilayer self-adhesive fouling release coating composition comprising the following layers:
(i) an optional removable underlying liner;
(ii) an adhesive layer applied over and to the optional underlying liner when the latter is present;
(iii) a synthetic material layer applied over and to the adhesive layer (ii);
(iv) optionally, an intermediate silicone tie coat applied over and to the synthetic material layer (iii);
(v) a silicone fouling release top coat applied over and to the synthetic material layer (iii), or, when present, over and to the intermediate silicone tie coat (iv); and optionally
(vi) a removable polymeric film applied over and to the fouling release top coat (v).

The multilayer self-adhesive fouling release coating composition can be directly applied on a substrate's surface, such as on the hull of a boat, in one single step, by simply pasting the self-adhesive composition on the surface to be coated, and thus avoiding the drawbacks of the fouling release compositions of the prior art requiring an application by spraying.

In a second aspect, the invention provides a multilayer self-adhesive fouling release coating composition comprising the following layers:
(i) An optional removable underlying liner;
(ii) An adhesive layer applied over and to the optional underlying liner when the latter is present;
(iii) A layer comprising a polar thermoplastic polymer applied over and to the adhesive layer (ii), the polar thermoplastic polymer being selected from a thermoplastic polyurethane or a polyolefin grafted with polar groups,
(iv) An intermediate silicone tie coat applied over and to the layer comprising a polar thermoplastic polymer (iii),
(v) A silicone fouling release top coat applied to and over the intermediate silicone tie coat (iv), and optionally
(vi) A removable polymeric film.

DETAILED DESCRIPTION OF THE INVENTION

As used herein, the expression "applied over and to" means that the layers are joined together, that is, are directly in contact with each other.

In a first aspect, the invention provides a multilayer self-adhesive fouling release coating composition comprising the following layers:
(i) an optional removable underlying liner;
(ii) an adhesive layer applied over and to the optional underlying liner when the latter is present;
(iii) a synthetic material layer applied over and to the adhesive layer (ii);
(iv) optionally, an intermediate silicone tie coat applied over and to the synthetic material layer (iii);
(v) a silicone fouling release top coat applied over and to the synthetic material layer (iii), or, when present, over and to the intermediate silicone tie coat (iv); and optionally
(vi) a removable polymeric film applied over and to the fouling release top coat (v).

The multilayer self-adhesive fouling release coating composition can be directly applied on a substrate's surface, such as on the hull of a boat, in one single step, by simply pasting the self-adhesive composition on the surface to be coated, and thus avoiding the drawbacks of the fouling release compositions of the prior art requiring an application by spraying. The self-adhesive composition according to the present invention is not to be regarded as obvious for a person skilled in the art, since such person would rather try to optimize the known spraying techniques to improve the application of a fouling release product.

Figure 1:
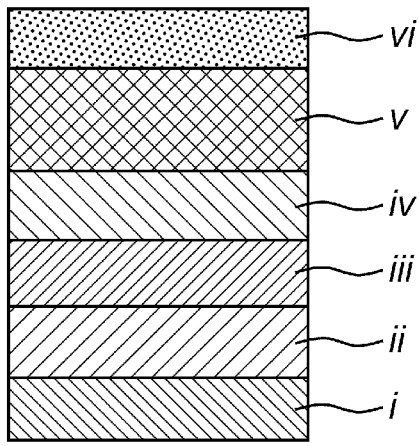
FIG. 1 is a schematic sectional view of an embodiment of a self-adhesive fouling release composition for preventing and reducing the adhesion of aquatic organisms.
Figure 3:
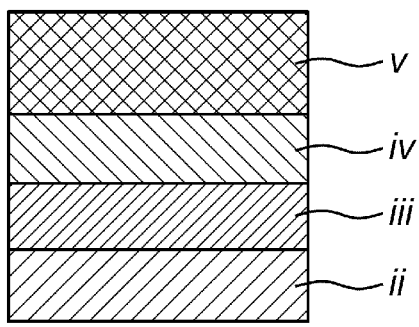
FIG. 3 is a schematic sectional view of a part of an embodiment of a self-adhesive fouling release composition which is applied on an underwater structure.

A self-adhesive fouling release composition for preventing and reducing the adhesion of aquatic organisms according to a preferred embodiment of the present invention is composed as illustrated on FIG. 1. An "applied self-adhesive fouling release composition" is used herein to indicate the multilayer self-adhesive fouling release composition as if applied on a structure, such as an underwater structure. An "applied self-adhesive fouling release composition" thus comprises a layered structure as schematically shown in FIG. 3: the applied composition comprises layers (ii) up to (v), since the removable liner (i) is to be removed prior to application of the composition on a substrate's surface and the removable polymeric film (vi) is to be removed once the composition has been applied over a surface to be coated.

In embodiments, the thickness of the self-adhesive fouling composition of the present invention depends on the thickness of each layer in the composition provided that the properties claimed in the present invention are not affected. In preferred embodiments, the thickness of the self-adhesive fouling release composition is from 50 µm to 5000 µm, more preferably from 100 µm to 2000 µm, and even more preferably from 200 µm to 700 µm.

In preferred embodiments, the strength of adhesion of aquatic organisms onto an applied self-adhesive fouling release composition of the present invention is 0.1 N/mm² or less, more preferably 0.01 N/mm² or less, still more preferably 0.002 N/mm² or less. The lower the strength of adhesion is between the fouling release top coat and the aquatic organism, the more efficient is the composition in terms of fouling release properties. The low strength of adhesion may also be beneficial to low drag properties.

The strength of adhesion of aquatic organism onto an applied self-adhesive fouling release composition may be measured with a dynamometer such as an ADEMVA DM10. The method may be as follow: apply a pressure on the aquatic organism to release it from the fouling release top coat of an applied self-adhesive fouling release composition.

In preferred embodiments, the self-adhesive fouling release composition has an impact absorption rate of 10% or more. When the value is within this range, the composition has an efficient bonding to reduce and prevent fouling.

In preferred embodiments, the self-adhesive fouling release composition is flexible enough to allow a good conformation to all irregular shapes of the underwater structure to wrap. The flexibility may be measured by testing the tensile strength of the composition at 10% elongation, according to the method ISO 527-3/2/300.

The tensile strength at 10% elongation at 23° C. is preferably 100 N/15 mm or less, more preferably 80 N/15 mm or less and still more preferably 60 N/15 mm or less. When the tensile strength at 10% elongation is within one of these ranges, the composition can be applied with satisfaction on the shapes of the underwater structure. A high tensile strength at 10% elongation, being outside the above ranges, of the self-adhesive fouling release composition may cause some lifting from the irregular underwater structure, and is therefore undesired.

The elongation at break of the self-adhesive fouling release composition depends on the elongation of each layer illustrated in FIG. 3. The elongation at break at 23° C. is preferably 15% or more, more preferably 50% or more. When the elongation at break is in the range, the composition can be applied with satisfaction on the shapes of the underwater structure and give a good re-workability during the time of application. If the elongation at break is less than 15% of elongation, the working efficiency could be reduced because of the low elongation and breaking of the self-adhesive composition.

The tensile strength at break of the self-adhesive fouling release composition depends on the elongation of each of the layers illustrated in FIG. 3. In preferred embodiments, the tensile strength at break at 23° C. is 10 N/15 mm or more and more preferably 20 N/15 mm or more. The more the tensile strength at break is in the range, the more the composition can be applied with satisfaction on the shapes of the underwater structure and give a good re-workability during the time of application. If the tensile strength at break is less than 10 N/15 mm, the working efficiency could be reduced because of the fast breaking of the composition, and is therefore undesired.

In preferred embodiments, the 180° peeling strength of adhesion of the self-adhesive fouling release composition at a speed of 300 mm/min between the adhesive layer (ii) and the underwater structure, as measured according to the Finat test method FTM 1 at 23° C., is 10 N/25 mm or more, more preferably 25 N/25 mm or more and still more preferably 40 N/25 mm or more. The higher the peeling strength is the lower is the risk to have self-lifting from the underwater surface.

In the following, further embodiments of the first aspect of the present invention will be covered by describing the individual layers of said multilayer self-adhesive fouling release coating composition.

Layer (i)

The composition according to the first aspect of the invention may optionally comprise a removable liner (i) applied on the adhesive layer (ii), which is removed prior to application of the composition on a substrate's surface. In a preferred embodiment, the removable liner (i) is present. In preferred embodiments, the removable liner (i) is a siliconized paper or siliconized synthetic layer. In embodiments wherein the removable polymeric film layer (vi) is not comprised in the self-adhesive fouling release composition according to the invention, as in the embodiments shown in FIG. 3 and FIG. 4, the removable liner (i) can exert two functional roles: 1) the role of a liner for the adhesive layer (ii) and 2) when the multilayer self-adhesive composition is wound into a roll, the role of a protective material for the silicone tie coat (iv) or the silicone fouling release top coat (v).

Figure 4:
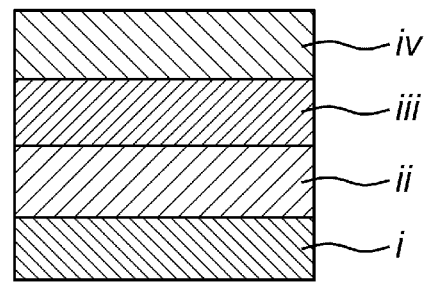
FIG. 4 is a schematic sectional view of a part of an embodiment of a self-adhesive fouling release composition which is wound after coating of a tie coat (iv), enabling the contact between a removable liner (i) and a tie coat layer (iv).

In preferred embodiments, such removable liner (i) is preferably a clay coated backing paper coated by an addition-type siliconized system. The clay coated paper contains a humidity rate preferably 3% and more, more preferably from 6% to 10% by weight of water. The humidity, contained in the paper, participates to the hydrolysis of the acetate ion, CH3COO—, which is a product formed during curing of the tie coat (iv). The acetate ion has to be destroyed during the process; the humidity contained in the liner participating in this hydrolysis of the acetate ion. The property of the clay coated removable liner is important as it is well-known that the kinetic and the post curing of the last deposit comprising the fouling release top coat (v) is affected by the presence of the acetate ion. Now, it has been observed that the humidified paper liner reduces the amount of residual acetic acid in the tie coat (iv) and thus advantageously enables to restore a good curing kinetic of the fouling release top coat (v). Indeed, in preferred embodiments, during curing of the tie coat (iv), the composition comprising layers (i), (ii), (iii), (iv) is wound into a roll so that layer (iv) comes into contact with layer (i) which may reduce the amount of acetate. When the roll is unwound, the fouling release top coat (v) may be coated on the tie coat layer (iv) which has a reduced amount of acetic acid. When a siliconized synthetic or polyethylene paper is used as removable liner, the acetate ion is not hydrolyzed when the composition illustrated in FIG. 4 is wound into a roll, which will slow down curing of the fouling release top coat (v) which is not dry after the process step and may give some variations of thickness of the fouling release top coat (v) by deepness in the roll.

In preferred embodiments, the weight of the removable liner (i) is 15 $g/m^2$ or more, more preferably 25 $g/m^2$ or more and even more preferably from 40 to 165 $g/m^2$. When the weight is within the range, the removability of the removable liner from the adhesive layer is satisfactory and enables a good working efficiency. When the weight is lower than 15 $g/m^2$, it becomes difficult to remove it, because of tearing of the removable liner, which may result in some parts of the liner that stay on the adhesive layer (ii).

In preferred embodiments, the strength of adhesion of the removable liner between the removable liner and the adhesive layer is 150 g/25 mm or less, more preferably 80 g/25 mm or less and even more preferably 60 g/25 mm or less. When the strength of adhesion is within the range, the removability of the removable liner from the adhesive layer is satisfactory and enables a good working efficiency. When the strength of adhesion is higher than 150 g/25 mm, it becomes difficult to remove it because of tearing of the removable liner, which may result in some parts of the liner that stay on the adhesive layer (ii).

Layer (ii)

The composition according to the first aspect of the invention further includes an adhesive layer (ii) which is capable of securing the fouling release composition to a desired location. Conventional adhesives include notably pressure sensitive adhesives (PSA).

The pressure sensitive adhesives (PSA) can be any pressure sensitive adhesive having at least the following characteristics: (a) is capable of creating lasting adhesion to the material to be coated, such as the ship hull material, and the synthetic material layer (iii) of the present invention, for at least five years; (b) is resistant to marine conditions.

In a preferred embodiment, a PSA for the adhesive layer (ii) is defined to insure the optimal properties for the present invention. The material used for such application could be for example acrylic PSA resin, epoxy PSA resin, amino based PSA resin, vinyl based PSA, silicone based PSA resin, etc. In preferred embodiments, the PSA is a solvent based acrylic adhesive, more preferably a solvent based acrylic adhesive resistant to water and allowing an application at low temperatures from −10° C. to 60° C. and more preferably from 3° C. to 30° C. This characteristic should permit an application during all the year.

PSA based on acrylic acid polymers, notably comprising an acrylic polymer and a cross-linking agent are particularly suitable. Examples of such acrylic polymers are polymers formed from monomeric acrylic acid and/or an acrylic ester. A cross-linking agent starts the polymerization by forming free radicals which attack the double bonds in said monomeric acrylic acid and/or acrylic acid compounds. The polymerization is stopped either by an inhibitor or by a recombination of radicals. A suitable cross-linking agent includes an isocyanate crosslinker. In other embodiments, the cross-linking agent includes a metal organic curing agent, an isocyanate curing agent or others.

Example of metal curing agent:

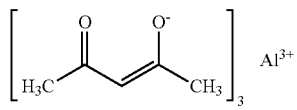

Examples of the crosslinking process of the adhesive used for the pressure sensitive fouling release.

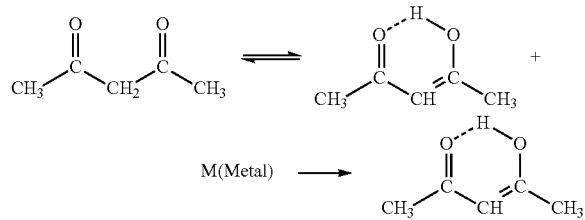

The outer surface of the adhesive layer (ii) may be covered with a removable liner (i) which is released prior to application.

In preferred embodiments, the layer (ii) will generally have a thickness between 5 µm and 250 µm, and more preferably between 60 µm and 150 µm depending on the type of adhesive used and the application envisaged.

Layer (iii)

The composition according to the first aspect of the present invention further includes a layer (iii) of synthetic material, or synthetic material layer (iii), allowing to coat an optional tie coat layer (iv) on one side, and the adhesive layer (ii) on the other side. The synthetic material has preferably excellent properties of impermeability, water resistance, flexibility and elongation. In preferred embodiments, the polymeric material for the synthetic material layer includes a polyurethane resin, a polyurethane acrylic resin, a vinyl chloride resin, a rubber-based resin, a polyester resin, a silicone resin, an elastomer resin, a fluoro resin, a polyamide resin and/or a polyolefin resin, such as polypropylene and polyethylene. Such materials for the synthetic material layer (iii) may be present in one sub-layer or may be present in two sub-layers or more. The nature and components of each of said sub-layers can bring additional anchorage and barrier properties to the synthetic material layer (iii).

When the synthetic material layer (iii) contains an elastomer, the elastomer is preferably an olefin-based elastomer. In preferred embodiments, the olefin-based elastomer is a polypropylene-based elastomer. In preferred embodiments, said polypropylene-based elastomer is selected from the group comprising no-oriented polypropylene, bi-oriented polypropylene and blow polypropylene, or any combination thereof. It is well-known that elastomers possess the mechanical property to undergo elastic deformation under stress with the material returning to its previous size without permanent deformation. The use of an olefin-based elastomer can thus provide a self-adhesive fouling release composition that can be applied on a flat and curved surface with good workability without wrinkles formation. Said polypropylene-based elastomer further allows a good anchorage on the layer (ii), the optional layer (iv) and, when the optional layer (iv) is not present, on the layer (v). By good anchorage of layers is meant that the layers (ii) and (iii), the layers (iii) and (iv) and, when the optional layer (iv) is not present, the layers (iii) and (v) do not split up during the period and under the conditions of intended product use.

Figure 2:
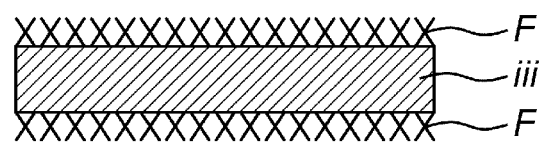
FIG. 2 is a schematic sectional view of an embodiment of a layer (iii) having functional groups on both its surfaces to increase the surface energy.

In preferred embodiments, to further ameliorate the anchorage of said synthetic material layer (iii), the synthetic material layer (iii) is treated on one or both of its sides. In preferred embodiments, said synthetic material layer (iii) is treated on one or both of its sides, preferably on both of its sides, using a corona treatment or a plasma treatment, resulting in epoxy functional groups, acrylic functional groups, carboxylic functional groups, amino functional groups, urethane functional groups, and/or silicone functional groups on the surface of the synthetic material layer (iii). In other preferred embodiments, said synthetic material layer (iii) is treated on one or both of its sides, preferably on both of its sides, by using a primer treatment. In preferred embodiments, the synthetic material layer (iii) comprises a polypropylene-based elastomer and is treated on one or both of its sides, preferably on both of its sides, with a plasma treatment using a $N_2$ gas, providing amide, amine and imide functional groups on one or both of the sides, preferably on both sides, of said layer (iii). A schematic sectional view of an embodiment wherein the synthetic material layer (iii) is provided with functional groups on both of its sides or surfaces, in order to increase the surface energy, is shown in FIG. 2.

If the synthetic material layer (iii) is porous to any component which could migrate and modify the original properties of the composition, it could be necessary to adjust the synthetic material layer (iii) thickness and/or adding a barrier layer in the synthetic material layer (iii) or to its surface. The thickness of synthetic material depends on the nature of the synthetic material layer (iii) provided that the properties of the present invention are not deteriorated. In preferred embodiments, the thickness of the synthetic material layer (iii) is from 10 µm to 3000 µm, more preferably from 30 µm to 1000 µm and even more preferably from 50 µm to 300 µm. When the thickness is too low, the migration from any component coming from optional layer (iv) or layer (v), or a water molecule, may go through the synthetic material layer (iii) and modify the original properties of the composition.

Layer (iv)

The composition according to the first aspect of the present invention further includes an optional tie coat layer (iv) which may be used as a bond between the synthetic material layer (iii) and the fouling release top coat (v). In preferred embodiments, the tie coat layer (iv) is a one component silicone system, a two components silicone system or a three components silicone system. The two latter systems are curable by an addition-type or condensation-type curing system. The composition of the tie coat layer is preferably a two components polysiloxane or a silane silicone curable by a poly-condensation system which means that the polysiloxane or silane contains reactive groups which enable curing. In preferred embodiments, the tie coat layer is an organo functional silane having the following chemical structure:

X—CH$_2$CH$_2$CH$_2$Si(OR)$_{3-n}$R'$_n$ where n=0,1,2

The OR groups are hydrolysable groups such as, preferably, methoxy, ethoxy or acetoxy groups and more preferably acetoxy groups. The group X is preferably an organo functional group such as epoxy, amino, methacryloxy or sulfide groups, more preferably organo functional groups with the addition of an acid or an organic acid. The acid can preferably be a carboxylic acid, particularly preferably acetic acid. The addition of acid greatly increases the adhesion of a silicone elastomer as fouling release top coat (v).

In preferred embodiments, the thickness of the tie coat layer is preferably from 10 μm to 120 μm, more preferably from 20 μm to 80 μm and still more preferably from 30 μm to 60 μm. When the value is within the range, the tie coat layer (iv) is dry after a heating step during a process for the manufacture of the composition, for example, when it leaves an oven during such manufacturing process, and has a good anchorage on the synthetic material layer (iii). It also enables to have a satisfactory anchorage of the fouling release top coat (v) which is coated on the tie coat layer. When the thickness is higher than 120 μm, the tie coat (iv) is not dry after a heating step and the consequence is that it sticks on the removable liner (i) when the composition illustrated in FIG. 4 is wound, and then the next step, which is the coating of the fouling release top coat (v), cannot be done. When the thickness is lower than 20 μm, the combination of tie coat layer (iv) and fouling release top coat (v) may be removed from the self-adhesive fouling release composition, resulting in loss of the fouling release properties.

Layer (v)

The composition according to the first aspect of the present invention further includes a silicone fouling release top coat (v). In preferred embodiments, the silicone fouling release top coat (v) comprises a silicone resin. The number of kinds of silicone resins may be only one or two or more. Such silicone resin may be a condensation-type silicone resin or may be an addition-type silicone resin. In addition, the silicone resin may be a one-component silicone resin to be dried alone or a two-components silicone resin to be compounded with a curing agent. The silicone resin is preferably an elastomer silicone resin, more preferably a polysiloxane containing reactive groups which can react with a curing agent by a condensation-type reaction. This kind of silicone system gives good properties of low surface energy. Examples of polysiloxane are polydialkylsiloxane, polydiarylsiloxane or polyalkylarylsiloxane typically of the formula:

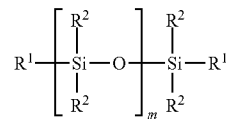

In preferred embodiments, the fouling release top coat (v) contains a fouling release agent. Any appropriate fouling release agent may be used as fouling release agent as far as the fouling release effect is not damaged. Example of such fouling release agents include, but are not limited to, silicone oil, liquid paraffin, surfactant wax, petrolatum, animal fats and fatty acid. The number of different kinds of fouling release agent may be one, two or more. When the fouling release top coat (v) contains a fouling release agent, the surface energy of the fouling release top coat (v) is lower and the self-adhesive fouling release composition maintains a good fouling release property for a long time period. This fouling release agent migrates to the surface of the silicone resin as matrix and covers the surface of the fouling release top coat (v) with the fouling release component to reduce and prevent the fouling on an underwater structure by reducing the surface energy. The fouling release agent is preferably a silicone oil, more preferably a non-hydrolysable silicone oil and is preferably free of reactivity with the silicone resin. In a preferred embodiment, the silicone fouling release top coat (v) comprises a non-hydrolysable silicone oil which is free of reactivity with the silicone of said fouling release top coat (v). The latter composition of the top coat (v) is especially preferred since it allows for the fouling release effect to be maintained for a long time period. Said silicone oil is preferably composed by a homopolymer siloxane oil or a copolymer siloxane oil, such as a phenyl-methyl dimethyl siloxane copolymer and phenyl-methyl siloxane homopolymer.

In preferred embodiments, the rate of silicone oil present in the fouling release layer is from 0.1 to 150% dry weight, more preferably from 1 to 100% dry weight and still more preferably from 2 to 50% dry weight. When the value is within the range, the self-adhesive fouling release composition has good fouling release properties to reduce and prevent the fouling on an underwater structure. When the value is lower than 0.1% dry weight, the fouling release property is not achieved and the amount of fouling cannot be reduced or prevented on an underwater structure. When the value is higher, the silicone oil is released from the self-adhesive fouling release composition and may cause a problem for the anchorage of the fouling release top coat (v) on the tie coat layer (iv) or the synthetic material layer (iii).

In preferred embodiments, the thickness of the fouling release top coat (v) is from 80 μm to 800 μm, more preferably from 120 to 300 μm and still more preferably from 180 to 250 μm. When the value is within the range, the fouling release top coat (v) is dry after a heating step during a process for the manufacture of the composition, for example, when it leaves an oven during such manufacturing process, and has fouling release properties to reduce and prevent the apparition of aquatic organisms on an underwater structure. When the thickness is lower than 80 μm, the fouling release property may not be sufficient to reduce and prevent the apparition of aquatic organisms on and underwater structure, which will increase the water friction and reduce the speed and maneuverability of said underwater structure.

Layer (vi)

The composition according to the first aspect of the present invention may comprise a removable polymeric and/or protective film applied over and to the fouling release top coat (v) in order to protect the latter, and which is to be removed notably once the adhesive layer of the composition has been applied over the surface to be coated. In a preferred embodiment, the removable polymeric film (vi) is present in the composition according to the first aspect of the present invention.

In preferred embodiments, the removable polymeric film (vi) is a polyester or a polypropylene film. Said film advantageously prevents the migration of silicone and/or exuding liquid up to the adhesive layer (ii) when the composition comprising layers (i), (ii), (iii), (iv), (v) and (vi) is wound into a roll, wherein the layer (v) would come into contact with layer (i) when layer (vi) would be absent. This is likewise the case when the composition comprising layers (ii), (iii), optionally (iv), (v) and (vi) is wound into a roll, wherein the layer (v) would come directly into contact with layer (ii) when layer (vi) would be absent. In other embodiments, the removable polymeric film comprises polyvinylidene fluoride, polyurethane, polyvinylchloride or another material.

The layer (vi) has possibly one function or more, preferably two functions or more. One function could be the protection of the layer (v) from scratch and scuff during the manipulation and the application. The layer (vi) of the self-adhesive fouling release composition has to be removed just after the adhesive layer of the composition has been applied over the surface to be coated.

A second function may be the transfer of a removable polymeric film (vi) with a defined engineered surface to the layer (v). In a preferred embodiment, the removable polymeric film (vi) is laminated on top of a fouling release top coat (v) which is not completely dry. In this preferred embodiment, post-curing is subsequently used to create a specific surface of the top coat (v) of the self-adhesive fouling release composition. If the appearance of the layer (vi) is an ultra-smooth film, the layer (v) will be extra smooth. In preferred embodiments, the removable polymeric film (vi) is structured with a positive relief. Due to contact between the removable polymeric film (vi) and the silicone fouling release top coat (v), the negative of said positive relief is transferred on the surface of the fouling release top coat (v), providing an engineered surface of said top coat (v). The aim of the engineered surface is to improve the drag resistance and the fouling release property. A third function may be, when the multilayer self-adhesive fouling release coating composition is wound into a roll, to prevent the migration of components from layers (iv) and (v) through the layer (i) which could modify the original properties of the composition.

In a preferred embodiment, the composition according to the first aspect of the present invention includes layers (i), (ii), (iii), (iv), (v) and (vi) and can be wound and stored into a roll.

In a second aspect, the invention provides a multilayer self-adhesive fouling release coating composition comprising the following layers:
(i) An optional removable underlying liner;
(ii) An adhesive layer applied over and to the optional underlying liner when the latter is present;
(iii) A layer comprising a polar thermoplastic polymer applied over and to the adhesive layer (ii), the polar thermoplastic polymer being selected from a thermoplastic polyurethane or a polyolefin grafted with polar groups,
(iv) An intermediate silicone tie coat applied over and to the layer comprising a polar thermoplastic polymer (iii),
(v) A silicone fouling release top coat applied to and over the intermediate silicone tie coat (iv), and optionally
(vi) A removable polymeric film.

Layer (i)

The compositions according to the invention may optionally comprise a removable liner applied on the adhesive layer (ii), which is removed prior to application on the substrate's surface. In a preferred embodiment, the removable liner (i) is present.

In a particular embodiment, the removable liner is a humidified paper, notably containing more than 4%, notably more than 6% by weight of water.

This embodiment is particularly advantageous when a tie coat containing a vulcanizable silicone is used, in particular when acetic acid is released during the curing of the tie coat. Indeed, the acetic acid yielded in the tie coat subsequently dramatically slows the kinetic of FR top coat curing. Now, it has been observed that the humidified paper liner reduces the amount of residual acetic acid in the tie coat and thus advantageously enables to restore a good curing kinetic of the FR top coat. Indeed, during curing of the tie coat, the composition comprising layers (i), (ii), (iii), (iv) is wound into a roll so that layer (iv) comes into contact with layer (i) which may absorb the released acetic acid. When the roll is unwound, the FR top coat (v) may be then applied on the tie coat (iv) having a reduced amount of acetic acid.

Layer (ii)

The compositions according to the invention further include an adhesive layer (ii) which is capable of securing the fouling release compositions to the desired location. Conventional adhesives include notably pressure sensitive adhesives (PSA).

The pressure sensitive adhesives (PSA) can be any pressure sensitive adhesive having at least the following characteristics: (a) is capable of creating lasting adhesion to the material to be coated, such as the ship hull material, and the polymeric layer (iii) of the present invention, for at least five years; (b) is resistant to marine conditions.

PSA based on acrylic acid polymers, notably comprising an acrylic polymer and a cross-linking agent are particularly suitable. Examples of such PSA formulations include acrylic base polymers available commercially from Henkel sold under the brand name of Loctite DuroTak®. The cross-linking agent includes isocyanate crosslinker available commercially from Bayer sold under the brand name Desmodur®.

The outer surface of the adhesive layer (ii) may be covered with a removable liner which is released prior to application.

The layer (ii) will generally has a thickness between 40 µm and 200 µm, and more preferably 60 µm and 100 µm depending on the type of material used and the application envisaged. The layer (ii) typically represents 8 to 30% by weight of the composition.

Layer (iii)

The composition of the invention includes a layer (iii) of a polar thermoplastic polymer, allowing to join together both the fouling release composition, including the tie coat and the FR top coat, on the one hand, and the adhesive layer (ii) on the other hand. As used herein, the wording "polar thermoplastic polymer" means a thermoplastic polymer which contains in its molecular structure, at least one atom selected from nitrogen, oxygen and halogen in addition to carbons and hydrogens.

Unexpectedly, it has been found that these polar thermoplastic polymers advantageously provide a good adhesion between the silicone tie coat and the adhesive. In addition, they prevent the exuding liquid optionally present in the silicone FR top coat to migrate through the underlying adhesive layer and thus to subsequently alter its adherence to the surface of the substrate. This adherence to the substrate's surface is further improved thanks to their thermoplastic properties and their ability to conform with surface irregularities of the substrate.

In a particular aspect, the surface of the layer (iii) in contact with the tie coat (iv) comprises or consists of a thermoplastic polymer selected from a polyurethane or a polyolefin grafted with polar groups.

Polar thermoplastic polymers according to the invention are selected from a polyurethane or a polyolefin grafted with polar groups.

The polyurethane is notably a thermoplastic polyurethane which is generally referred to as TPU.

TPU is a linear segmented block copolymer composed of hard and soft segments. The hard segment can be either aromatic or aliphatic. Aromatic TPU's are based on isocyanates such as methylene diphenyl 4,4'-diisocyanate (MDI) while aliphatic TPU's are based on isocyanates like 4,4'-methylenebis(cyclohexyl isocyanate) (also referred to as H12 MDI). When these isocyanates are combined with short-chain diols, they become the hard block. Generally it is aromatic, but when color and clarity retention in sunlight exposure is a priority, an aliphatic hard segment is preferably used.

In a particular aspect, TPU is notably an aliphatic polyurethane such as 49510 on PET, 0.006 (Argotec).

The polyolefin may be a polyethylene (PE) or polypropylene (PP), preferably a polypropylene (PP).

In a preferred aspect, the polar thermoplastic polymer is or comprises a polyolefin grafted with polar groups, notably groups containing at least one atom selected from nitrogen, oxygen and halogen, such as groups containing a carboxylic acid or an anhydride acid. Polyolefin grafted with polar groups may notably be prepared by subjecting at least one of the surfaces of a polyolefin layer to a plasma treatment. In a preferred embodiment, the surface of layer (iii) in contact with the layer (iv) is grafted with polar groups.

In a further aspect, the polar thermoplastic polymer is a polypropylene grafted with acrylic acid (and herein referred to as PP-g-AA).

PP-g-AA comprises a polypropylene backbone, which contains tertiary hydrogens which are highly oxidizable. In this polymer, some quantity of the polypropylene units are grafted with blocks of one or more acrylic acid units. By "grafted" in this context is meant that an acrylic acid block forms a bond with a carbon atom of a polypropylene unit. One acrylic acid block can be grafted to one, two, or more polypropylene units in one or more polypropylene macromolecules. In one embodiment, less than about 5 mol % of the polypropylene units of the polymer are grafted with an acrylic acid block. There are many commercial polypropylene grafted with acrylic acid including, for example, CP28UB Embossing 11(Profol).

The layer (iii) comprising a polar thermoplastic polymer according to the invention has typically a thickness between 30 μm and 300 μm. The layer (iii) typically represents 6 to 40% by weight of the composition.

Layer (iv)

The compositions of the invention further comprise an intermediate silicone tie-coat (iv). Silicone tie-coats are well known to those skilled in the art, for example those disclosed in U.S. Pat. No. 4,861,670.

In one aspect, the silicone tie-coat (iii) contains vulcanizable silicon.

As an example of a commercially available tie-coat, mention may be made of SIGMAGLIDE® 790 sold by PPG.

The layer (iv) has typically a thickness between 10 μm and 100 μm, preferably between 20 μm and 50 μm. The layer (iv) typically represents 12 to 16% by weight of the composition.

Layer (v)

The compositions of the invention further comprise a silicone top coat (v).

Typically, this is a polysiloxane based coating such as polydialkyl siloxanes, for example, polydimethylsiloxane. The polysiloxane based coating may be a two component or a one component coat. Preferably, the coating is a two part composition. It may comprise or may be the product polymerization and/or curing of at least one reactive silicone, at least one condensation catalyst and at least one crosslinking agent.

The reactive silicone is preferably at least one of a polydialkylsiloxane, a polydiarylsiloxane, or a polyalkylarylsiloxane typically of the formula

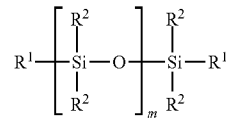

wherein each R1 is a hydroxyl radical or

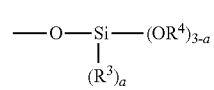

each R2 independently represents a hydrocarbon or fluorinated hydrocarbon radical, each R3 and R4 independently represents a hydrocarbon radical, a is 0 or 1, and m has a value such that the viscosity of said compound under ambient temperature and pressure conditions is up to 50,000 centipoise. Examples of hydrocarbon radicals are C1-20 alkyl, C6-20 aryl, C6-20 alkaryl, vinyl, isopropenyl, allyl, butenyl and hexenyl. Preferred examples include phenyl, C1-4 alkyl and especially methyl.

An example of a fluorinated hydrocarbon radical is 3,3, 3-trifluoropropyl. Preferably, each R2, R3 and R4 is alkyl and more preferably methyl.

The biofouling release coatings may comprise or maybe the product polymerization of two or more reactive silicones, differing in average molecular weight, which give a bimodal composition known to have advantages over a simple monomodal composition.

The condensation catalyst may be any of those known to be useful for promoting condensation curing of an RTV (Room Temperature Vulcanizable) material. Suitable catalysts include tin, zirconium, titanium, and aluminum compounds. Examples include dibutyltin dilaurate, dibutyltin diacetate, dibutyltin methoxide, dibutyltin bis (acetylacetonate), 1,3-dioxypropane-titanium bis (acetylacetonate), titanium naphthenate, tetrabutyl titanate, zirconium octanoate, and aluminum acetylacetonate. Various salts of organic acids with such metals as lead, iron, cobalt, manganese, zinc, antimony and bismuth may also be used. Preferred catalysts are the tin and titanium compounds.

Suitable crosslinking agents include trifunctional (T) and tetrafunctional (Q) silanes. The term "functional" in this context means the presence of a silicon-oxygen bond. Suitable crosslinking agents include methyltrimethoxysilane, methyltriethoxysilane, 2-cyanoethyltrimethoxysilane, methyltriacetoxysilane, tetraethyl silicate and tetra-n-propyl silicate. Preferably, the Q-functional compounds, tetraalkyl silicates, are used.

Other additives include reinforcing and extending (non-reinforcing) fillers. Suitable reinforcing fillers are commercially available in the form of relatively large aggregated particles typically having an average size significantly greater than 300 nanometers (nm). Preferred fillers are the silica fillers, including fumed silica and precipitated silica. Those two forms of silica have surface areas in the ranges of 90-325 and 8-150 m2/g, respectively.

The reinforcing filler may be pretreated with a treating agent to render it hydrophobic. Typical treating agents may be selected from cyclic silicones such as cyclooctamethyltetrasiloxane and acyclic and cyclic organosilazanes such as hexamethyidisilazane, 1,3-divinyl-1,1,3,3-tetramethyidisilazane, hexamethylcyclotrisilazane, octamethyl cyclotetrasilazane, and mixtures thereof. An especially preferred treating agent is hexamethyidisilazane.

Non-reinforcing fillers may be selected from titanium dioxide, lithopone, zinc oxide, zirconium silicate, iron oxides, diatomaceous earth, calcium carbonate, glass fibers or spheres, magnesium oxide, chromic oxide, zirconium oxide, aluminum oxide, crushed quartz, calcined clay, talc, kaolin, asbestos, carbon, graphite, cork, cotton and synthetic fibres.

The relative proportions of the various constituents of the silicone composition may be varied within wide limits. The amount of filler is typically about 5-200 parts and more typically 10-150 parts by weight per 100 parts of reactive silicone. Catalysts and crosslinkers may be present in the amounts of 0.001-2.5% and about 0.25-5.0% by weight respectively, based on the combination of reactive silicone and filler.

Suitable addition curable silicone coating materials may also be employed for the fouling release coat. Such addition curable coating materials are known to those skilled in the art such as those described in EP 0874032.

In a particular embodiment, the FR top coat comprises a vulcanizable silicone and an exuding liquid. The exuding liquid, which is released very slowly through the silicone polymer generally enables to even more retard the built-up of undesired organisms and hence to further improve the fouling release properties of the vulcanizable silicone. Exuding liquids include compounds having a boiling point at atmospheric pressure of at least 250° C. Examples of exuding liquids comprise silicone oils, low molecular weight polyolefins, polyesters, polyisocyanates, polyurethanes, polyepoxides. The exuding liquid is notably a silicone oil. Silicone oils generally consists of polydihydrocarbyl siloxanes, of which the hydrocarbyl groups may be substituted with heteroatoms. The hydrocarbyl groups may be alkyl groups, in particular methyl groups, or all or part thereof may be aryl groups, in particular phenyl groups.

The silicone FR top coat may be 10-600 µm, more typically 20-500 µm, most typically 30-400 µm, and more preferably a 150-250 µm dried film thickness. The layer (v) typically represents 25% to 45% by weight of the composition.

An example of a commercially available silicone top coat is SIGMAGLIDE® 890 sold by PPG.

Layer (vi)

The compositions of the invention may comprise a removable polymeric and/or protective film applied over and to the FR top coat (v) in order to protect the latter, and which is to be removed notably once the adhesive layer of the composition has been applied over the surface to be coated.

The removable polymeric film may be notably a polyester or a polypropylene film. This film advantageously prevents the migration of silicone and/or exuding liquid up to the adhesive layer (ii) when the composition comprising layers (i), (ii), (iii), (iv) and (v) is wound into a roll, and the layer (v) comes into contact with layer (i).

Advantageously, the protective film (vi) is applied on layer (v) prior to the complete curing and/or drying of the FR top coat, thereby enabling to structure the surface of the FR top coat, notably into a very smooth or an embossed surface.

The compositions of the invention preferably include layers (i), (ii), (iii), (iv), (v) and (vi) and can be wound and stored into a roll.

Method of Preparation of the Multilayer Self Adhesive Fouling Release Compositions of the Invention The compositions according to the invention may be prepared according to a method comprising the steps of:
a) coating a removable underlying liner (i) with an adhesive layer (ii);
b) coating the adhesive layer (ii) with a layer (iii) comprising a polar thermoplastic polymer selected from a polyurethane or a polyolefin grafted with polar groups;
c) coating the layer (iii) with a silicone tie coat (iv);
d) coating the tie coat (iv) with a silicone fouling release top coat (v), and
e) optionally, coating the silicone fouling release top coat (v) with a removable polymeric film.

Method of Preparation of a Coated Structure and Coated Structures

In another aspect, the present invention also relates to a method of preparation of a coated structure comprising the step of coating at least part of the outer surface of the structure with a multilayer self-adhesive fouling release coating composition according to the invention.

In a particular embodiment, the outer surface of the structure to be coated has been preliminary coated with an anti-corrosive layer, before applying the composition according to the invention.

In a further aspect, the invention further relates to a structure which has been coated at least partially with a composition according to the invention. Coated structures are notably immerged structures. Examples of coated structures notably include ship's hull, notably of commercial vessels or yachts, onshore structures such as pipelines for power stations, structures used in fish farming and offshore structures.

The invention claimed is:

1. A multilayer self-adhesive fouling release coating composition comprising:
a removable underlying liner;
an adhesive layer;
a synthetic material layer applied over and to the adhesive layer;
an intermediate silicone tie coat applied over and to the synthetic material layer;

a silicone fouling release top coat comprising a silicone resin and at least one fouling release agent selected from the group consisting of silicone oil, liquid paraffin, surfactant wax, petrolatum, an animal fat and a fatty acid, wherein the silicone fouling release top coat is applied over and to the intermediate silicone tie coat; and a removable polymeric film consisting of polypropylene and structured with a positive relief, wherein the removable polymeric film is applied over and to a surface of the silicone fouling release top coat such that a negative of the positive relief is transferred to the surface of the silicone fouling release top coat, wherein the synthetic material layer comprises a polypropylene-based elastomer selected from the group consisting of non-oriented polypropylene, bi-oriented polypropylene and blown propylene, or any combination thereof, which synthetic material layer is treated on one or both surfaces using a corona treatment or a plasma treatment resulting in one or more of acrylic functional groups and carboxylic functional groups on a surface of the synthetic material layer, wherein the removable underlying liner is applied over and to the adhesive layer and the removable underlying liner comprises a clay coated backing paper coated by an addition-curable siliconized coating, wherein the paper in the clay coated backing paper is humidified and contains 3% by weight or more of water.

2. The composition according to claim 1, wherein the silicone fouling release top coat comprises a non-hydrolysable silicone oil which is free of reactivity with the silicone of said silicone fouling release top coat.

3. The composition according to claim 1, wherein the intermediate silicone tie coat is a one component silicone system, a two component silicone system or a three component silicone system, the two and three component silicone systems being curable by an addition-type or condensation-type curing reaction.

4. The composition according to claim 1, wherein the removable underlying liner has a weight of 15 g/m$^2$ or more.

5. The composition according to claim 1, wherein the adhesive layer has a thickness of 150 μm to 250 μm.

6. The composition according to claim 1, wherein the silicone fouling release top coat comprises 0.1 to 150% dry weight of silicone oil relative to the amount of the silicone resin in the silicone fouling release top coat.

7. The composition according to claim 1, wherein the tensile strength of the composition at break at 23° C. is 10 N/15 mm or more.

8. The composition according to claim 1, wherein the elongation at break of the composition at 23° C. is 15% or more.

* * * * *